United States Patent
Chuang et al.

(10) Patent No.: US 12,120,293 B2
(45) Date of Patent: Oct. 15, 2024

(54) MMVD MODE SEPARATION AND INTERPOLATION REORDERING

(71) Applicant: MediaTek Inc., Hsinchu (TW)

(72) Inventors: Cheng-Yen Chuang, Hsinchu (TW); Man-Shu Chiang, San Jose, CA (US); Chun-Chia Chen, Hsinchu (TW); Chih-Wei Hsu, Hsinchu (TW); Tzu-Der Chuang, Hsinchu (TW); Ching-Yeh Chen, Hsinchu (TW); Yu-Wen Huang, Hsinchu (TW)

(73) Assignee: MediaTek Inc. (TW)

( * ) Notice: Subject to any disclaimer, the term of this patent is extended or adjusted under 35 U.S.C. 154(b) by 65 days.

(21) Appl. No.: 17/977,466

(22) Filed: Oct. 31, 2022

(65) Prior Publication Data
US 2023/0199170 A1 Jun. 22, 2023

Related U.S. Application Data

(60) Provisional application No. 63/290,075, filed on Dec. 16, 2021.

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/176* (2014.11); *H04N 19/423* (2014.11); *H04N 19/52* (2014.11)

(58) Field of Classification Search
CPC .. H04N 19/105; H04N 19/117; H04N 19/176; H04N 19/423; H04N 19/52
(Continued)

(56) References Cited

U.S. PATENT DOCUMENTS

| 12,010,321 | B2* | 6/2024 | Zhang | ............ H04N 19/52 |
| 2022/0295088 | A1* | 9/2022 | Zhang | ............ H04N 19/52 |

FOREIGN PATENT DOCUMENTS

| TW | 201010439 A | 3/2010 |
| TW | 202021349 A | 6/2020 |

OTHER PUBLICATIONS

Taiwan Intellectual Property Office, Office Action in Taiwan Patent Application No. 111148211, Aug. 7, 2023.

* cited by examiner

*Primary Examiner* — Dominic D Saltarelli
(74) *Attorney, Agent, or Firm* — Andy M. Han; Han IP PLLC

(57) ABSTRACT

A video coding system generating candidates for Merge Mode with Motion Vector Difference (MMVD) with reduced resource usage is provided. The system receives data to be encoded or decoded as a current block of a current picture of a video. The system identifies multiple MMVD candidates for different offset positions based on a merge candidate of the current block. The system generates reference samples for the identified MMVD candidates. The system reconstructs the current block or encodes the current block into a bitstream by using the generated reference samples. The system processes the MMVD candidates in separate groups: a first group of vertical MMVD candidates and a second group of horizontal MMVD candidates. The system generates the reference samples for the identified MMVD candidates by applying a vertical filter to source reference samples of horizontal MMVD candidates and then applying a horizontal filter to outputs of the vertical filter.

17 Claims, 15 Drawing Sheets

(51) Int. Cl.
  *H04N 19/176*  (2014.01)
  *H04N 19/423*  (2014.01)
  *H04N 19/52*  (2014.01)
(58) Field of Classification Search
  USPC .................................................. 375/240.16
  See application file for complete search history.

MMVD MODE SEPARATION AND INTERPOLATION REORDERING

CROSS REFERENCE TO RELATED PATENT APPLICATION(S)

The present disclosure is part of a non-provisional application that claims the priority benefit of U.S. Provisional Patent Application No. 63/290,075, filed on 16 Dec. 2021. Content of above-listed applications are herein incorporated by reference.

TECHNICAL FIELD

The present disclosure relates generally to video coding. In particular, the present disclosure relates to methods of generating candidates for Merge Mode with Motion Vector Difference (MMVD).

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To determine the Merge index for the Skip and Merge modes, the Merge scheme is used to select a motion vector predictor among a Merge candidate set containing four spatial MVPs and one temporal MVP.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coding system that generates candidates for Merge Mode with Motion Vector Difference (MMVD) with reduced resource usage is provided. The system receives data to be encoded or decoded as a current block of a current picture of a video. The system identifies multiple MMVD candidates for different offset positions based on a merge candidate of the current block. The system generates reference samples for the identified MMVD candidates. The system reconstructs the current block or encodes the current block into a bitstream by using the generated reference samples.

In some embodiments, the identified MMVD candidates may include a first group of MMVD candidates and a second group of MMVD candidates. The system may generate the reference samples by deriving a first set of reference samples for the first group of MMVD candidates and a second set of reference samples for the second group of MMVD candidates. The system may derive the first set of reference samples by accessing reference samples confined to a first access range and derive the second set of reference samples by accessing reference samples confined to a second, different access range. In some embodiments, the first group of MMVD candidates includes two or more vertical MMVD candidates with vertical offset positions from the merge candidate and the second group of MMVD candidates includes two or more horizontal MMVD candidates with horizontal offset positions from the merge candidate. The first group of MMVD candidates may include all vertical MMVD candidates and the second group of MMVD candidates may include all horizontal MMVD candidates for coding the current block using MMVD mode.

In some embodiments, the system generates the reference samples for the identified MMVD candidates by applying a vertical filter to source reference samples of horizontal MMVD candidates (MMVD candidates having horizontal offset positions) and then applying a horizontal filter to outputs of the vertical filter. The source reference samples may be stored in a shift register for the vertical filter. In some embodiments, each source reference sample has fewer bits (e.g., 10 bits) than a filtered result of each reference sample (e.g., 16 bits). When MMVD candidates come from unscaled list (not temporally scaled), at least some of the outputs of the horizontal filter are reused for different horizontal filter candidates.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
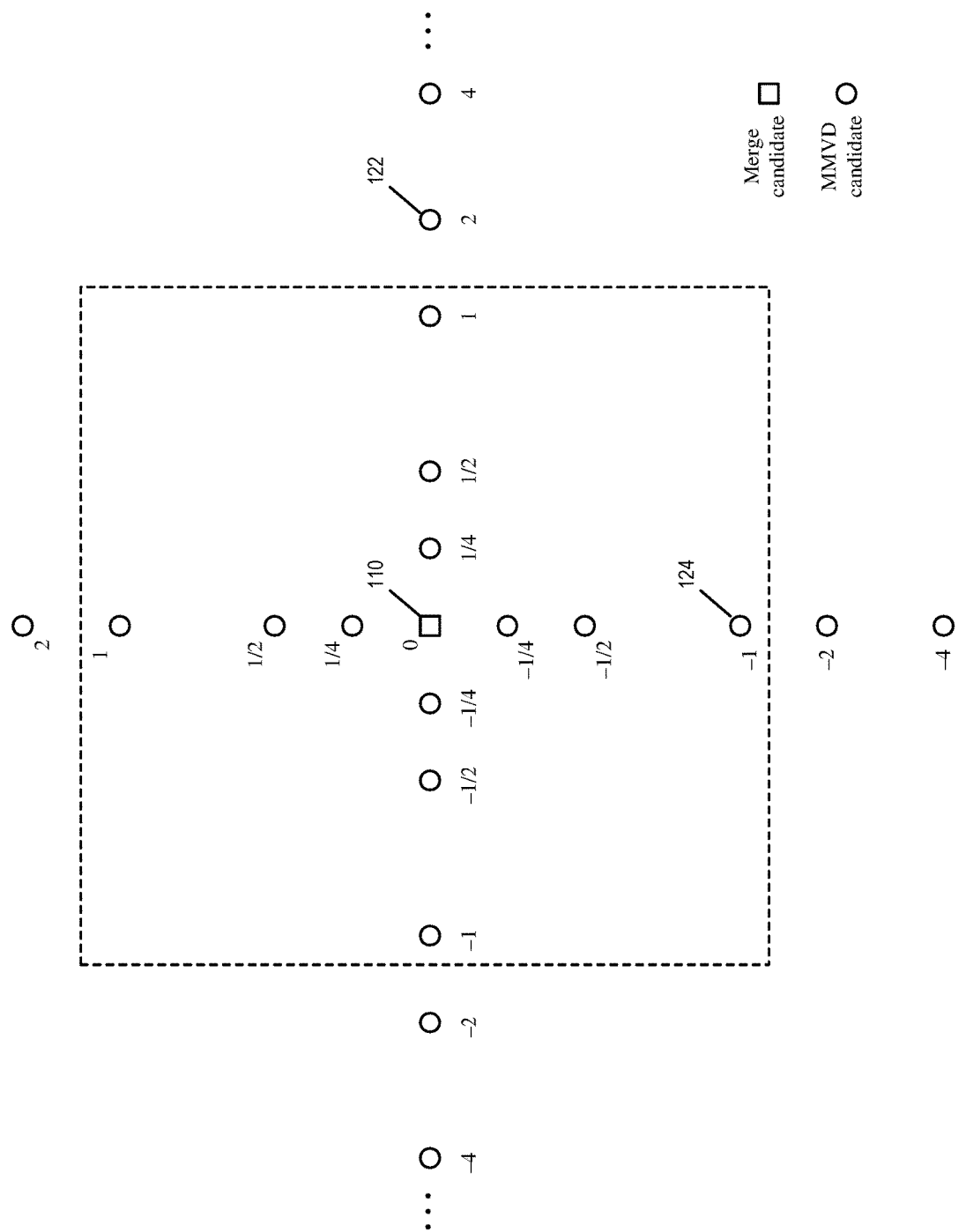
FIG. 1 conceptually illustrates MMVD candidates and their corresponding offsets.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Merge Mode with Motion Vector Difference (MMVD) is a new coding tool for the Versatile Video Coding (VVC) standard. Unlike regular merge mode in which the implicitly derived motion information is directly used for prediction samples generation of the current CU, in MMVD, the derived motion information is further refined by a motion vector difference MVD. MMVD also extends the list of candidates for merge mode by adding additional MMVD candidates based on predefined offsets (also referred to as MMVD offsets).

A MMVD flag may be signaled after sending a skip flag and merge flag to specify whether MMVD mode is used for a CU. If MMVD mode is used, a selected merge candidate is refined by MVD information. The MVD information also include a merge candidate flag, a distance index to specify motion magnitude, and an index for indication of motion direction. The merge candidate flag is signaled to specify which of the first two merge candidates is to be used as a starting MV.

The distance index is used to specify motion magnitude information by indicating a pre-defined offset from the starting MV. The offset may be added to either horizontal component or vertical component of the starting MV. An example mapping from the distance index to the pre-defined offset is specified in Table I-1 below:

TABLE I-1

| Distance Index | | | | | | | | |
|---|---|---|---|---|---|---|---|---|
| Distance Index | 0 | 1 | 2 | 3 | 4 | 5 | 6 | 7 |
| Offset (in unit of luma sample) | 1/4 | 1/2 | 1 | 2 | 4 | 8 | 16 | 32 |

The direction index represents the direction of the MVD relative to the starting point. The direction index can represent one of the four directions as shown in Table I-2.

TABLE I-2

| Sign of MV offset specified by direction index | | | | |
|---|---|---|---|---|
| Direction Index | 00 | 01 | 10 | 11 |
| x-axis | + | − | N/A | N/A |
| y-axis | N/A | N/A | + | − |

It's noted that the meaning of MVD sign may vary according to the information of the starting MV. When the starting MV is a uni-prediction MV or a bi-prediction MV with both lists pointing to the same side of the current picture (i.e., picture order counts or POCs, of the two reference pictures are both larger than the POC of the current picture or are both smaller than the POC of the current picture), the sign in Table I-2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), each sign in Table I-2 specifies the sign of the MV offset added to the list0 MV component of starting MV, and the sign for the list1 MV has opposite value. In some embodiments, a predefined offset (MmvdOffset) of a MMVD candidate is derived from or expressed as a distance value (MmvdDistance) and a directional sign (MmvdSign).

FIG. 1 conceptually illustrates MMVD candidates and their corresponding offsets. The figure illustrates a merge candidate 110 as the starting MV and several MMVD candidates in the vertical direction and the in the horizontal direction. Each of the MMVD candidate is derived by applying an offset to the starting MV 110. For example, the MMVD candidate 122 is derived by adding offset of 2 to the horizontal component of the merge candidate 110, and the MMVD candidate 124 is derived by adding offset −1 to the vertical component to the merge candidate 110. MMVD candidates with offsets in the horizontal direction, such as the MMVD candidate 122, are referred to as horizontal MMVD candidates. MMVD candidates with offsets in the vertical direction, such as the MMVD candidate 124, are referred to as vertical MMVD candidates.

In some embodiments, the MMVD offsets that are applied to derive the MMVD candidates are scaled based on the temporal positions (e.g., POCs) of the L1 and L0 references. Specifically, for each MMVD candidate, if abs(currPocDiffL0)≥abs(currPocDiffL1), the offset of L1 MVD is scaled, else the offset of L0 MVD is scaled. If currPocDiffL0 and currPocDiffL1 have different signs, inverse matching is applied when scaling the MMVD offset.

Figure 2:
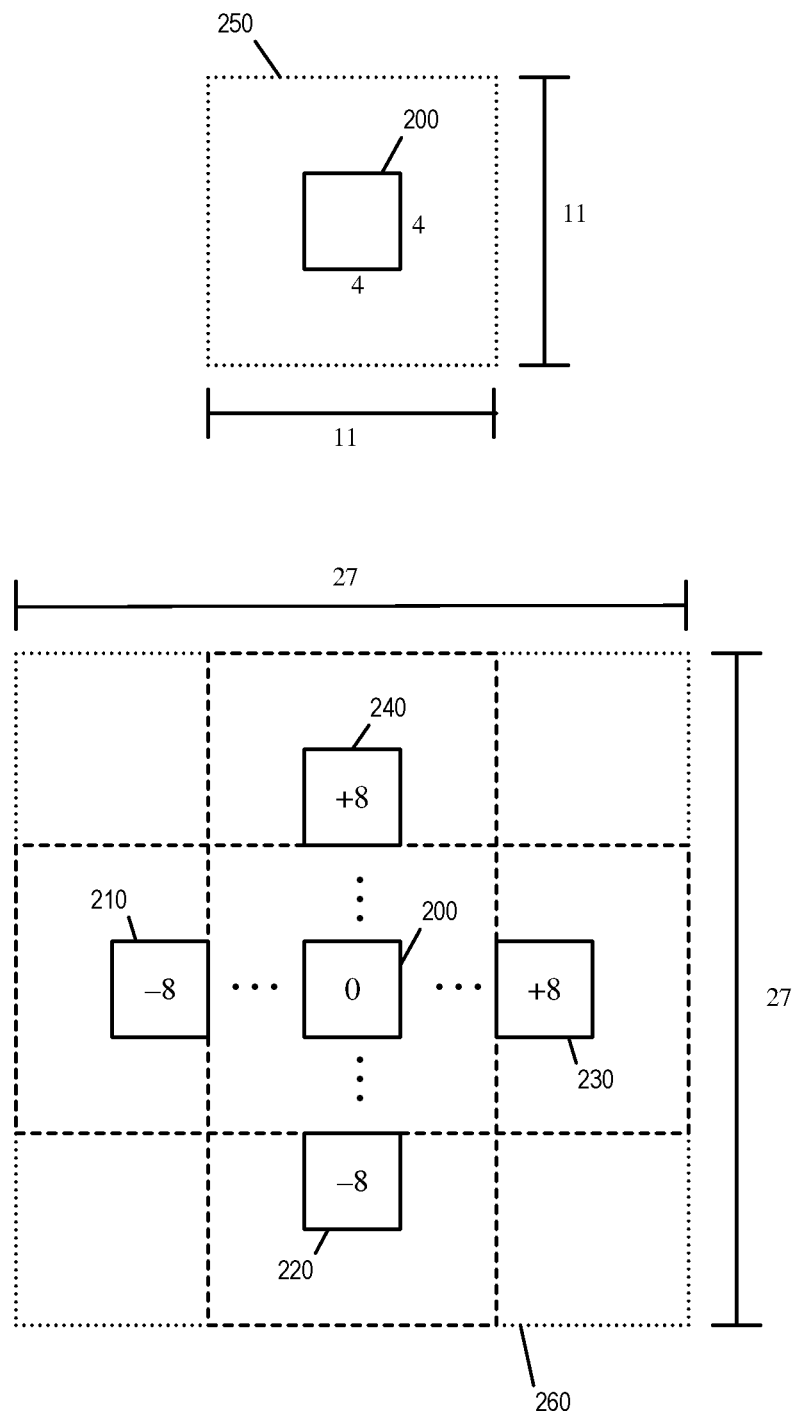
FIG. 2 conceptually illustrates access ranges for generating reference samples for merge mode and MMVD mode.

When generating the reference samples of each MMVD candidate, a software-style method can be used to generate reference samples for all MMVD candidates in one rate-distortion optimization (RDO) stage. FIG. 2 conceptually illustrates access ranges for generating reference samples for merge mode and MMVD mode. The figure illustrates a current block 200. The figure also illustrates MMVD candidates 210, 220, 230, and 240. The MMVD candidate 210 is a horizontal MMVD candidate having horizontal offset of −8. The MMVD candidate 220 is a vertical MMVD candidate having vertical offset of −8. The MMVD candidate 230 is a horizontal MMVD candidate having horizontal offset of +8. The MMVD candidate 240 is a vertical MMVD candidate having vertical offset of +8.

Larger MMVD offsets in different directions may require a large access range for generating the reference samples and therefore increased hardware cost. In the example of FIG. 2, with the current block 200 being 4×4, the access range 250 of the reference samples for merge mode is only 11×11. However, if the MMVD mode is used, and when the maximum offset for MMVD is 8, the access range 260 of reference samples increases to 27×27.

Some embodiments provide a video coding system in which the access range for generating reference samples for MMVD mode is reduced. In some embodiments, MMVD candidates are divided into several parts. For example, in some embodiments, the MMVD candidates for a current block is divided into two different groups of MMVD candidates such that the MMVD mode is processed in two low-complexity (LC) rate-distortion-optimization (RDO) stages: a first LC-RDO stage for processing horizontal MMVD candidates, and a second LC-RDO stage for processing vertical MMVD candidates.

Figure 3:
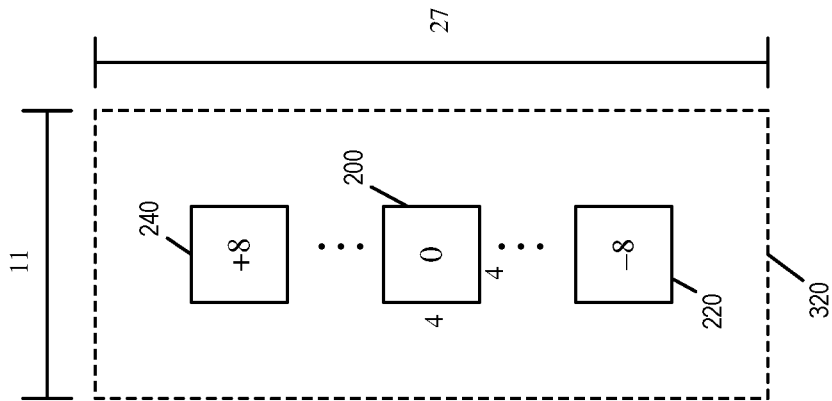
FIG. 3 illustrates MMVD candidates being divided into two groups to reduce the access range of reference samples for MMVD mode.
Figure 3:
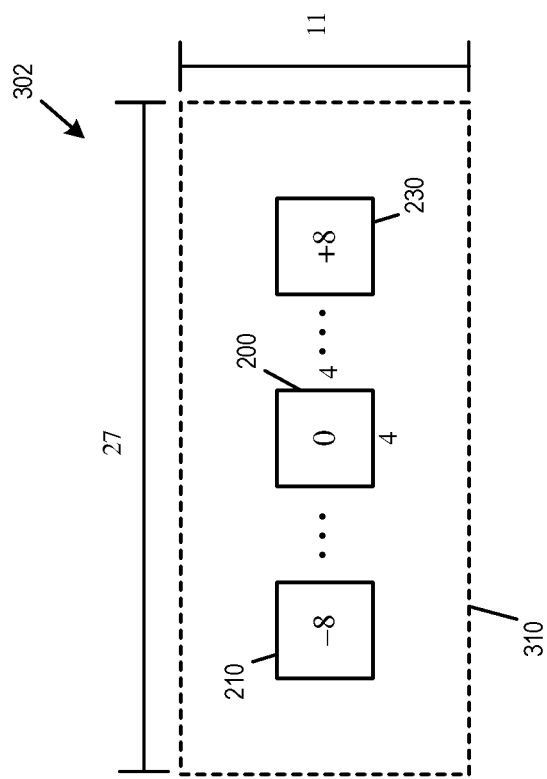

FIG. 3 illustrates MMVD candidates being divided into two groups to reduce the access range of reference samples for MMVD mode. In the figure, the MMVD candidates of the current block 200 are processed in two groups of MMVD candidates: a vertical group 301 and a horizontal group 302. The vertical group 301 of the MMVD candidates includes all vertical MMVD candidates, including the MMVD candidate 220 (with vertical offset −8) and the MMVD candidate 240 (with vertical offset+8). The horizontal group of the MMVD candidates include all horizontal MMVD candidate, including MMVD candidate 210 (with horizontal offset −8) and MMVD candidate 230 (with horizontal offset+8). The horizontal group 302 has an access range 310 with size 27×11. The vertical group 301 has an access range 320 with size 11×27.

Figure 4A:
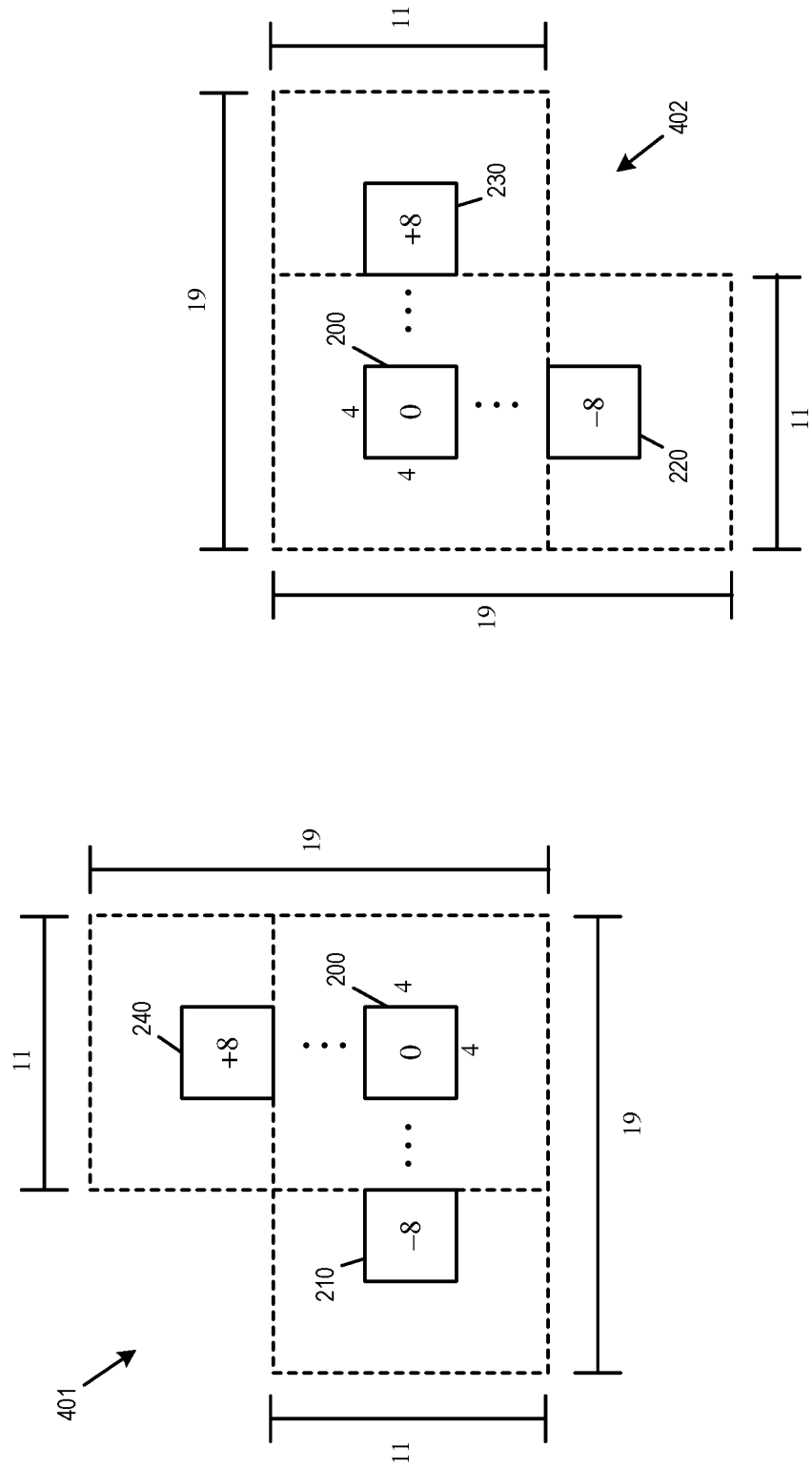
FIGS. 4A-B illustrate other divisions of MMVD candidates for reducing access ranges for generating reference samples.
Figure 4B:
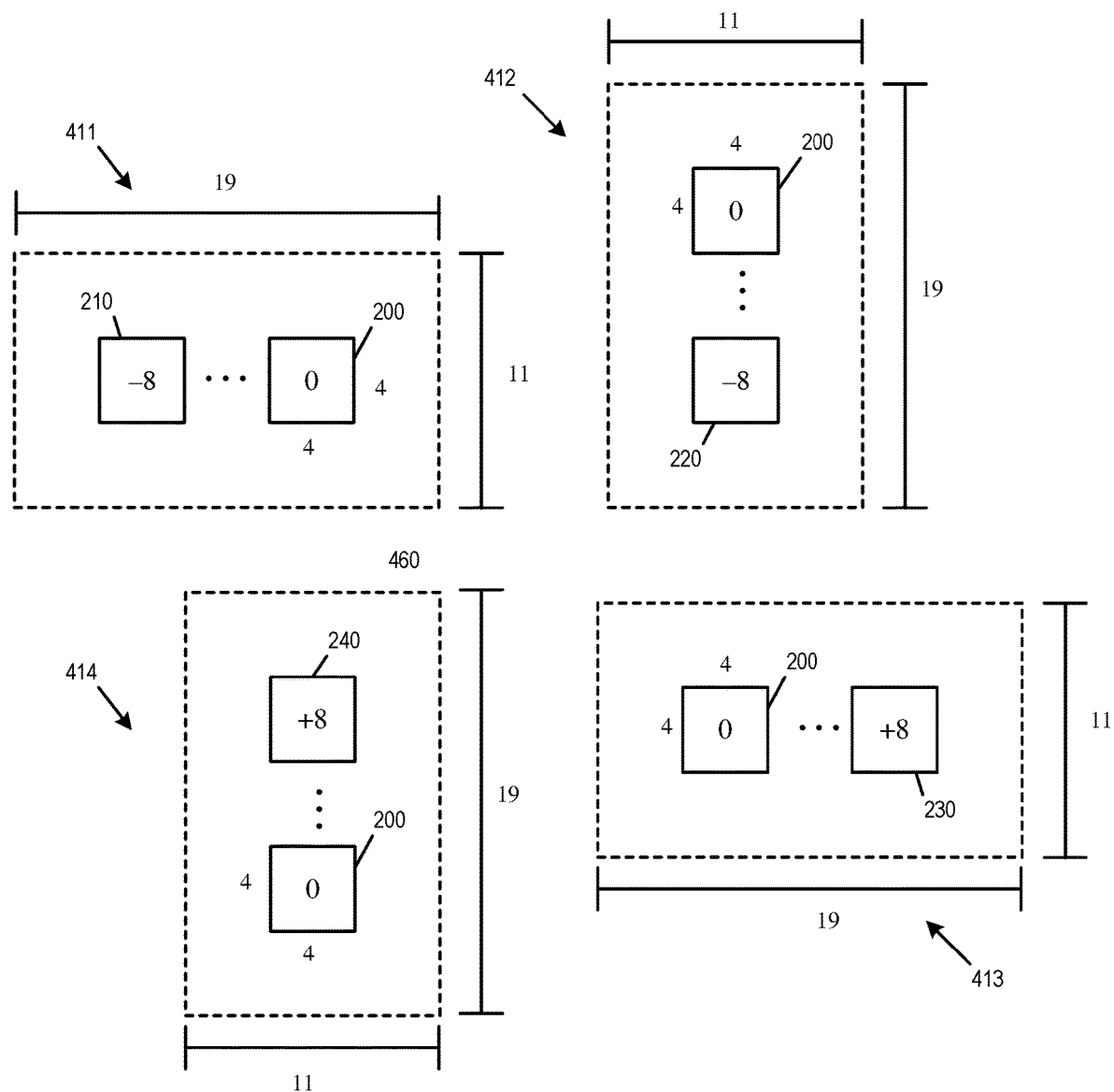

Other arrangements of dividing MMVD candidates into different groups for reducing access ranges are also possible. FIGS. 4A-B illustrate other divisions of MMVD candidates for reducing access ranges for generating reference samples.

FIG. 4A illustrates dividing MMVD candidates into two L-shaped groups of MMVD candidates 401 and 402 for the current block 200. Each L-shaped group includes half of the horizontal MMVD candidates and half of the vertical MMVD candidates. The L-shaped group 401 includes horizontal MMVD candidates with negative offsets down to offset −8, including the MMVD candidate 210. The L-shaped group 401 also includes vertical MMVD candidate with positive offsets up to offset+8, including the MMVD candidate 240. The size of the access range for the L-shaped group 401 is 19×19.

The L-shaped group 402 includes horizontal MMVD candidates with positive offsets up to offset+8, including the MMVD candidate 230. The L-shaped group 402 also includes vertical MMVD candidate with negative offsets down to offset −8, including the MMVD candidate 220 (offset −8). The size of the access range for L-shaped group 402 is 19×19. (So 19×19×2 in total).

FIG. 4B illustrates dividing MMVD candidates into four groups of candidates 411-414. The group 411 includes horizontal MMVD candidates with negative offsets down to −8, including the MMVD candidate 210. The group 412 includes vertical MMVD candidates with negative offsets down to −8, including the MMVD candidate 220. The group 413 includes horizontal MMVD candidates with positive offsets up to +8, including the MMVD candidate 230. The group 414 includes vertical MMVD candidates with positive offsets up to +8, including the MMVD candidate 240. Each of the four groups 411-414 has access range of 19×11 (so 19×11×4 in total).

In some embodiments, the reference samples of the MMVD candidates are filtered due to fractional positioning of the merge candidate and fractional offsets of the MMVD candidates. To derive the reference samples for different MMVD candidates, particularly those with fractional positions, vertical and horizontal filters are applied to generate filtered reference samples.

In some embodiments, the reference samples of all horizontal MMVD candidates are filtered by a horizontal filter first and then filtered by a vertical filter. For example, for the horizontal MMVD candidates in the horizontal candidate group 302 (with horizontal offsets from −8 to +8), the size of the reference samples is 28×4. The video coder may first apply horizontal filtering to the reference samples, then store the filtering result in a shift register (28 being the width of the access range of the horizontal MMVD candidates and 4 being the number of rows for the 4×4 block). The video coder then applies vertical filtering on the data stored in the shift register.

Figure 5:
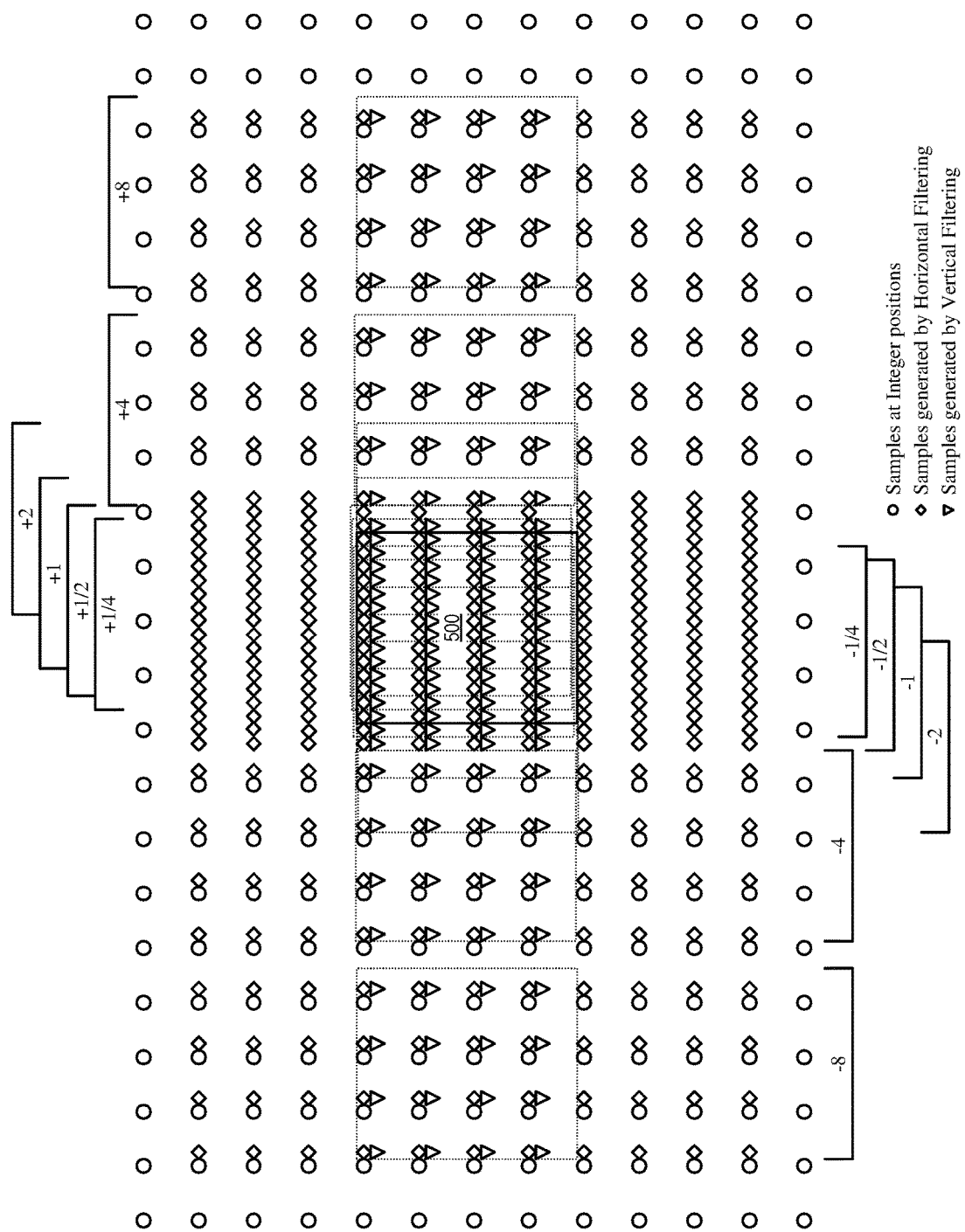
FIG. 5 illustrates filtering for horizontal MMVD candidates.

FIG. 5 illustrates filtering for horizontal MMVD candidates. The figure shows the filtering for a 4×4 block of pixels 500 whose merge candidate has fractional position of (+¼, −¼). The figure shows the filtered reference samples that are to be generated for all horizontal MMVD offsets (−8, −4, −2, −1, −½, −¼, ¼, ½, 1, 2, 4, 8) by horizontal and vertical filtering. As illustrated, 33 filtered reference samples are generated for each row, and there are 4 rows for the 4×4 block.

To generate these 33×4=132 filtered reference samples, the video coder applies 132-sample horizontal filtering first, then apply 132-sample vertical filtering. A shift register may be used to store the intermediate result of the horizontal filtering. The shift register initially stores the result of the horizontal filtering. With each sample of the horizontal filtering result having 16 bits, the size of the shift register is 33(samples/row)×7(row)×16(bits)=3696 bits. (Generating the vertical filtering result for each row of the horizontal MMVD candidates consumes horizontal filtering result of the 3 previous rows, thus a total of 7 rows of shift registers is used.)

The example of FIG. 5 is for MMVD candidates that are not scaled based on the temporal positions (unscaled list), and some of the filtered reference samples can be shared or reused by different MMVD candidates with different offsets. However, if MMVD candidates are to be scaled based on temporal positions (scaled list), different MMVD candidates with different offsets cannot share or reuse filtered reference samples. Thus, for 12 MMVD candidates from the scaled list, 4(width)×12(MMVD candidates)×4(rows)=192 reference samples are to be generated for the pixel block 500 using horizontal and vertical filtering. To generate these 192 filtered reference samples, the video coder may apply 192-sample horizontal filtering first, then apply 192-sample vertical filtering. If a shift register is used to store the result of the horizontal filtering for the vertical filtering, and with each filtered reference samples having 16 bits, the size of the shift register is 4(width)×12(MMVD candidates)×7(rows)×16(bits)=5376 bits.

Since MMVD mode has many fractional offsets, many horizontal and vertical filters are used, particularly for horizontal MMVD candidates with offsets±1, ±½, ±¼. It is observed that all horizontal MMVD candidates have the same vertical interpolation phase. Some embodiments of the disclosure use this property to reduce the size of the vertical filter.

In some embodiments, the video coder stores reference samples directly (e.g., 10 bits instead of 16 bits for horizontal filtering results) in the shift register and applies vertical filtering on the data stored in the shift register. The video coder then applies horizontal filtering on the result or output of the vertical filtering. This results in smaller filter size than applying horizontal filtering before vertical filtering.

Figure 6A:
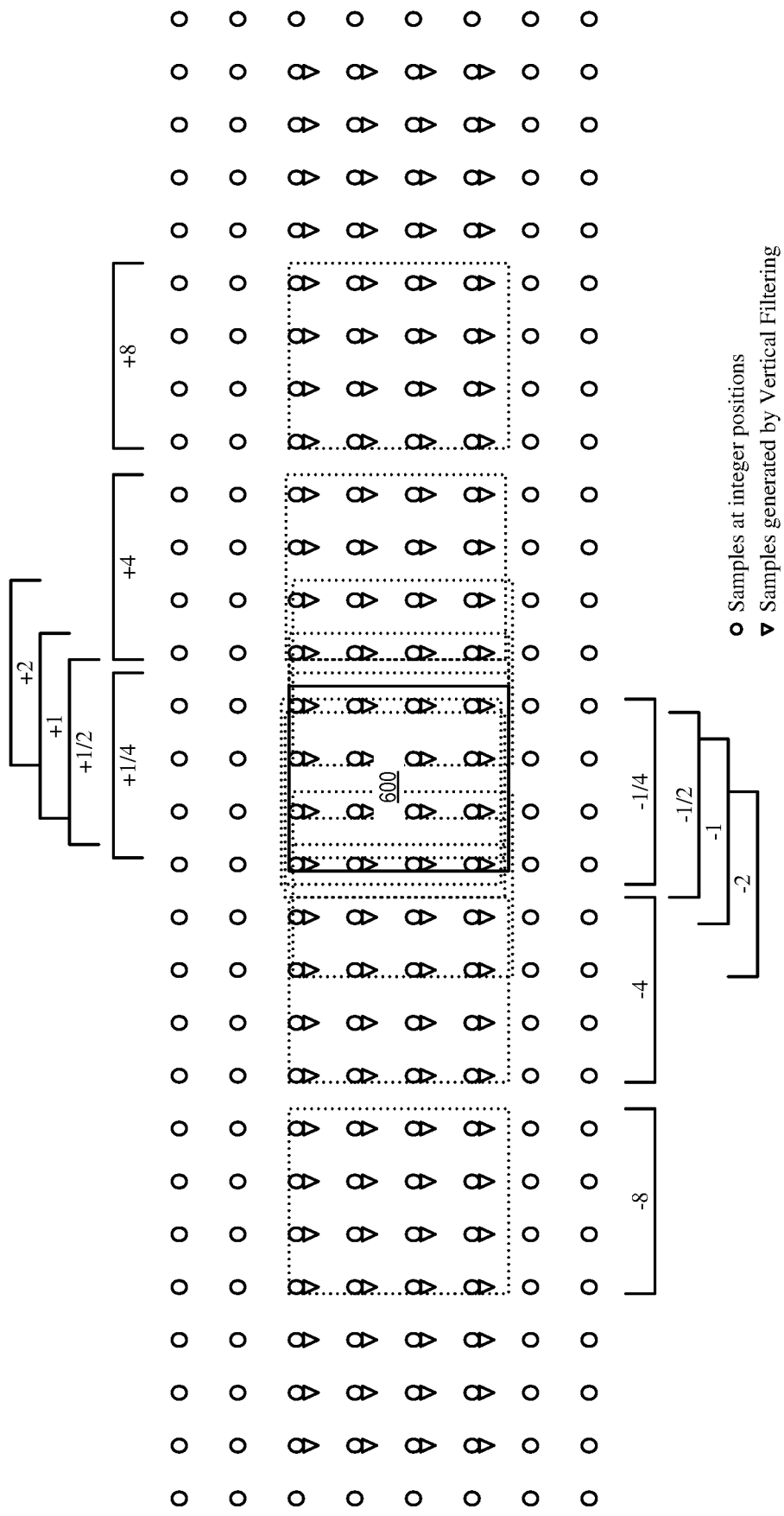
FIGS. 6A-B illustrate filtering of horizontal MMVD candidates with reduced filter size, in which vertical filtering is applied before horizontal filtering.
Figure 6B:
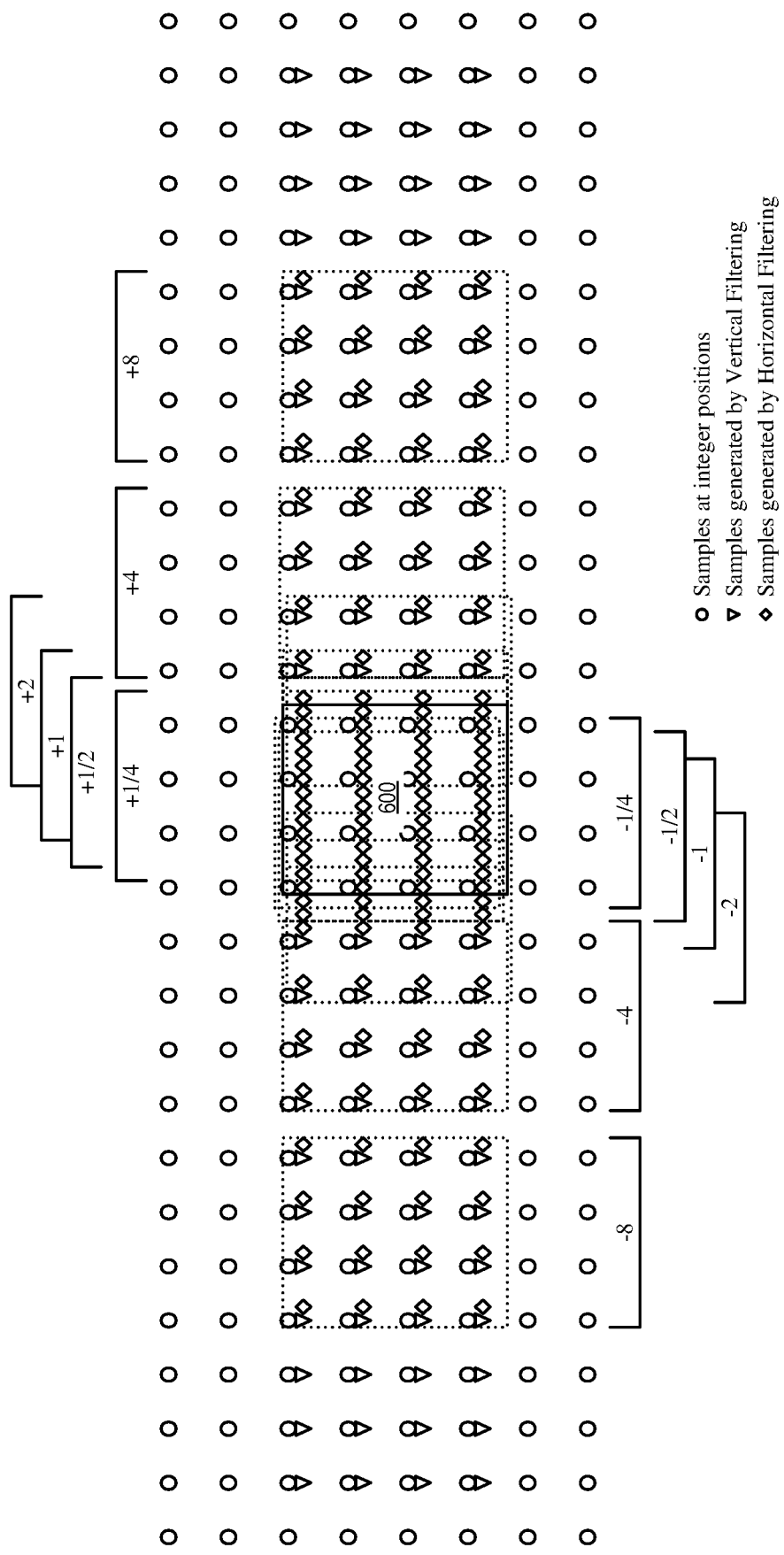

FIGS. 6A-B illustrate filtering of horizontal MMVD candidates with reduced filter size, in which vertical filtering is applied before horizontal filtering. The example is for a 4×4 block 600 whose merge candidate has fractional position of (+¼, −¼). The filtering is for generating filtered reference samples for the horizontal MMVD candidates with offsets −8, −4, −2, −1, −½, −¼, +¼, +½, 1, 2, 4, 8.

FIG. 6A illustrates vertical filtering being applied to the reference samples in the access range of the horizontal MMVD candidates. The figure illustrates 27×4=108 vertical filtering results being generated for 27×4 reference samples, as 27 reference samples per row is needed for the horizontal MMVD candidates of the 4×4 block.

FIG. 6B illustrates horizontal filtering being applied to result of the vertical filtering. Horizontal filtering is applied to generate the filtered reference samples for each of the horizontal MMVD candidates. As illustrated, 33 filtered samples are generated by horizontal filtering for each of the 4 rows. As mentioned above, for MMVD candidates that are not scaled based on the temporal positions (unscaled list), filtered samples can be shared by different MMVD candidates. Thus, 33 samples per row is sufficient for all horizontal MMVD candidates with offsets from −8 to +8. Thus 33×4=132 filtered reference samples are generated.

To generate these 33×4=132 filtered reference samples, the video coder applies the 108-sample vertical filtering to the source reference samples (pixel values at integer positions) of the horizontal MMVD candidates, then apply 132-sample horizontal filtering to the result of the vertical filtering. A shift register may be used to store the source reference samples. The shift register initially stores the source reference samples at integer positions. With each source reference sample being filtered being 10 bits, the size of the shift register is 27(samples/row)×7(row)×10(bits) =1890 bits. (Generating the vertical filtering result for each row of the horizontal MMVD candidates consumes reference samples of the 3 previous rows, thus a total of 7 rows of shift registers is used.)

If MMVD candidates are to be scaled based on temporal positions (scaled list), different horizontal MMVD candidates with different offsets cannot reuse or share filtered reference samples. Thus, for 12 MMVD candidates from the scaled list, 4(width)×12(MMVD candidates)×4(rows)=192 reference samples are to be generated for 4 rows using horizontal and vertical filtering. A shift register may be used to store the source reference samples. The shift register initially stores the source reference samples at integer positions. With each source reference sample being filtered being 10 bits, the size of the shift register is 27(samples/row)×7(row)×10(bits)=1890 bits.

Thus, by applying vertical filtering before horizontal filtering, significant saving in resources for computing filtered reference samples of horizontal MMVD candidates can be achieved. Table I-3 below is a summary of computing resource usage for filtering horizontal MMVD candidates. The table also shows a resource saving percentage when vertical filtering is applied first (as compared to horizontal filtering being applied first). As shown in the table, applying vertical filtering first result in savings in vertical filter size and shift register size while incurring no other computing resource cost.

TABLE I-3

| Candidate Type | Resource Used | Horizontal First | Vertical First | Saving |
|---|---|---|---|---|
| Scaled | Horizontal Filter | 132 | 132 | 0 |
|  | Vertical Filter | 132 | 108 | 18.18% |
|  | Shift Register | 3696 | 1890 | 48.86% |
| Unscaled | Horizontal Filter | 192 | 192 | 0 |
|  | Vertical Filter | 192 | 108 | 43.75% |
|  | Shift Register | 5376 | 1890 | 64.84% |

II. Example Video Encoder

Figure 7:
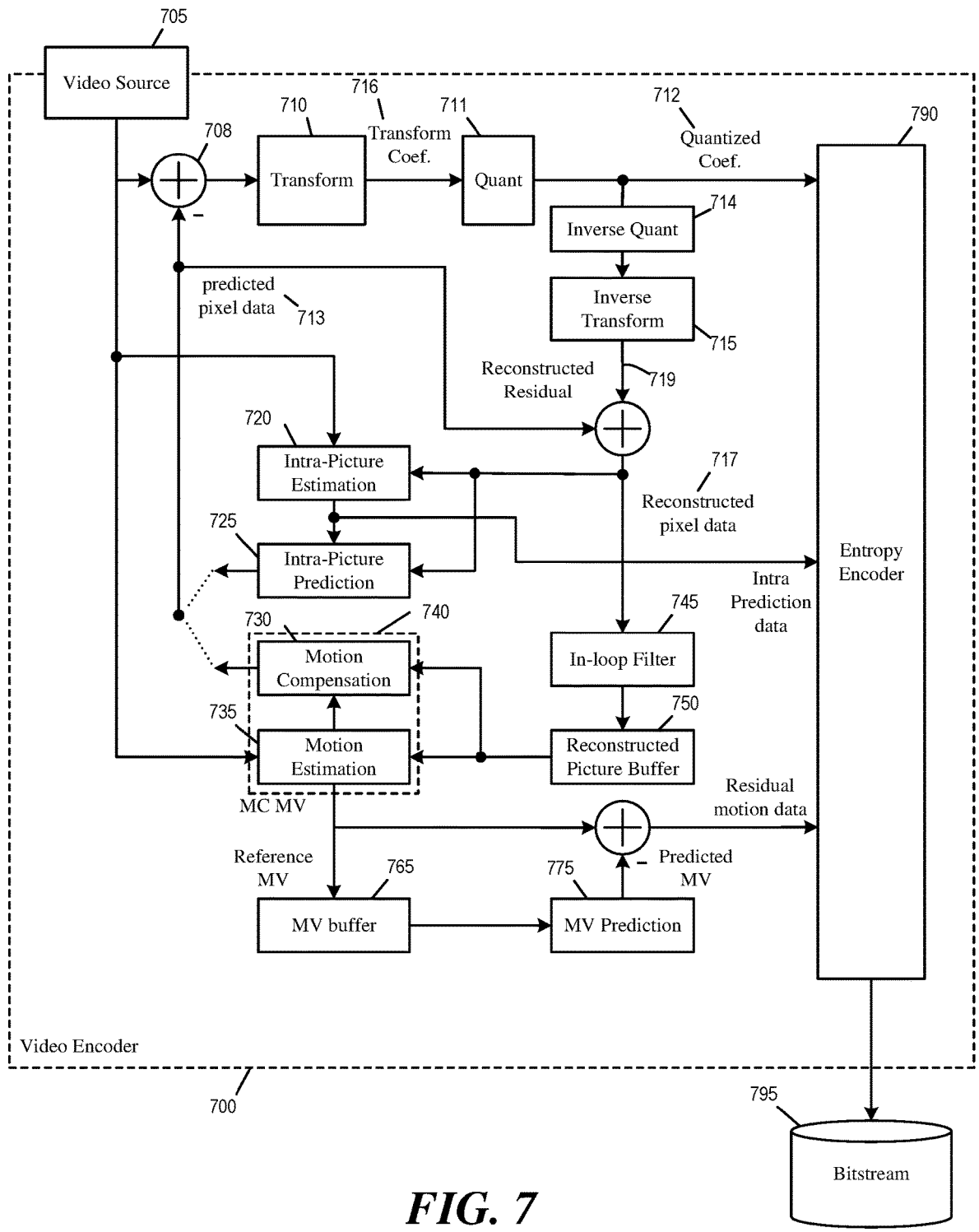
FIG. 7 illustrates an example video encoder that may use MMVD mode.

FIG. 7 illustrates an example video encoder 700 that may use MMVD mode for encoding pixel blocks. As illustrated, the video encoder 700 receives input video signal from a video source 705 and encodes the signal into bitstream 795. The video encoder 700 has several components or modules for encoding the signal from the video source 705, at least including some components selected from a transform module 710, a quantization module 711, an inverse quantization module 714, an inverse transform module 715, an intra-picture estimation module 720, an intra-prediction module 725, a motion compensation module 730, a motion estimation module 735, an in-loop filter 745, a reconstructed picture buffer 750, a MV buffer 765, and a MV prediction module 775, and an entropy encoder 790. The motion compensation module 730 and the motion estimation module 735 are part of an inter-prediction module 740.

In some embodiments, the modules 710-790 are modules of software instructions being executed by one or more processing units (e.g., a processor) of a computing device or electronic apparatus. In some embodiments, the modules 710-790 are modules of hardware circuits implemented by one or more integrated circuits (ICs) of an electronic apparatus. Though the modules 710-790 are illustrated as being separate modules, some of the modules can be combined into a single module.

The video source 705 provides a raw video signal that presents pixel data of each video frame without compression. A subtractor 708 computes the difference between the raw video pixel data of the video source 705 and the predicted pixel data 713 from the motion compensation module 730 or intra-prediction module 725. The transform module 710 converts the difference (or the residual pixel data or residual signal 708) into transform coefficients (e.g., by performing Discrete Cosine Transform, or DCT). The quantization module 711 quantizes the transform coefficients into quantized data (or quantized coefficients) 712, which is encoded into the bitstream 795 by the entropy encoder 790.

The inverse quantization module 714 de-quantizes the quantized data (or quantized coefficients) 712 to obtain transform coefficients, and the inverse transform module 715 performs inverse transform on the transform coefficients to produce reconstructed residual 719. The reconstructed residual 719 is added with the predicted pixel data 713 to produce reconstructed pixel data 717. In some embodiments, the reconstructed pixel data 717 is temporarily stored in a line buffer (not illustrated) for intra-picture prediction and spatial MV prediction. The reconstructed pixels are filtered by the in-loop filter 745 and stored in the reconstructed picture buffer 750. In some embodiments, the reconstructed picture buffer 750 is a storage external to the video encoder 700. In some embodiments, the reconstructed picture buffer 750 is a storage internal to the video encoder 700.

The intra-picture estimation module 720 performs intra-prediction based on the reconstructed pixel data 717 to produce intra prediction data. The intra-prediction data is provided to the entropy encoder 790 to be encoded into bitstream 795. The intra-prediction data is also used by the intra-prediction module 725 to produce the predicted pixel data 713.

The motion estimation module 735 performs inter-prediction by producing MVs to reference pixel data of previously decoded frames stored in the reconstructed picture buffer 750. These MVs are provided to the motion compensation module 730 to produce predicted pixel data.

Instead of encoding the complete actual MVs in the bitstream, the video encoder 700 uses MV prediction to generate predicted MVs, and the difference between the MVs used for motion compensation and the predicted MVs is encoded as residual motion data and stored in the bitstream 795.

The MV prediction module 775 generates the predicted MVs based on reference MVs that were generated for encoding previously video frames, i.e., the motion compensation MVs that were used to perform motion compensation. The MV prediction module 775 retrieves reference MVs from previous video frames from the MV buffer 765. The video encoder 700 stores the MVs generated for the current video frame in the MV buffer 765 as reference MVs for generating predicted MVs.

The MV prediction module 775 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 795 by the entropy encoder 790.

The entropy encoder 790 encodes various parameters and data into the bitstream 795 by using entropy-coding techniques such as context-adaptive binary arithmetic coding (CABAC) or Huffman encoding. The entropy encoder 790 encodes various header elements, flags, along with the quantized transform coefficients 712, and the residual motion data as syntax elements into the bitstream 795. The bitstream 795 is in turn stored in a storage device or transmitted to a decoder over a communications medium such as a network.

The in-loop filter 745 performs filtering or smoothing operations on the reconstructed pixel data 717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 8:
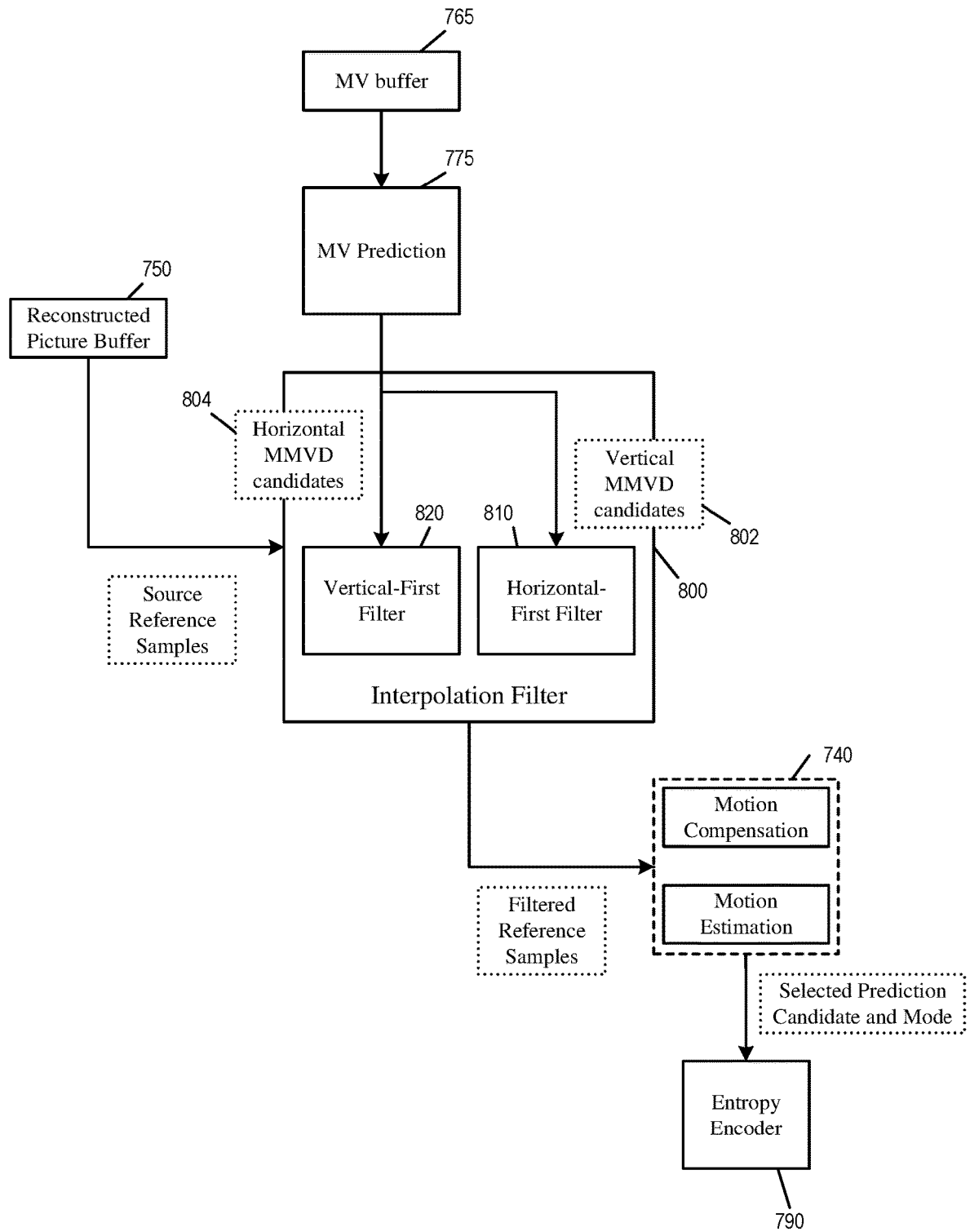
FIG. 8 illustrates portions of the video encoder that implements MMVD mode separation and interpolation reordering.

FIG. 8 illustrates portions of the video encoder 700 that implements MMVD mode separation and interpolation reordering. Specifically, the figure illustrates the components of the video encoder 700 that is configured to process the MMVD candidates in two or more groups and to perform vertical filtering before horizontal filtering for some of the MMVD candidates.

As illustrated, the MV prediction module 775 accesses the MV buffer 765 to identify candidates for various MV prediction modes, including candidates for merge mode and MMVD mode. An interpolation filter module 800 receives pixel data from the reconstruction picture buffer 750 to be used as source reference samples. The interpolation filter module 800 performs interpolation for fractional positions based on the source reference samples for various candidates identified by the MV prediction module 775. Specifically, MMVD candidates are processed as two (or more) groups, including a group of vertical MMVD candidates 802 and a group of horizontal MMVD candidates 804. In some embodiments, the two groups 802 and 804 are process in two different LC-RDO stages.

The interpolation filter module 800 includes a horizontal-first filter 810 and a vertical-first filter 820. The horizontal-first filter 810 performs horizontal filtering on source reference samples, stores the filtered result in a shift register, and performs vertical filtering on the data stored in the shift register. The vertical-first filter 820 stores source reference samples in a shift register, performs vertical filtering on the data in the shift register, and performs horizontal filtering on the result of the vertical filtering. In some embodiments, the group of horizontal MMVD candidates 804 are filtered by the vertical-first filter 820, while other prediction candidates, including the group of vertical MMVD candidates 802, are processed by the horizontal-first filter 810. The output of the interpolation filter module 800 is then provided to the inter-prediction module 740 as filtered reference samples for motion compensation and motion estimation operations. Based on the filtered reference samples, the inter-prediction module 740 may select one of the identified MMVD candidates as the prediction mode to encode the current block, such that the generated reference samples of the selected MMVD candidate is the basis of the residual signal being encoded into the bitstream.

Figure 9:
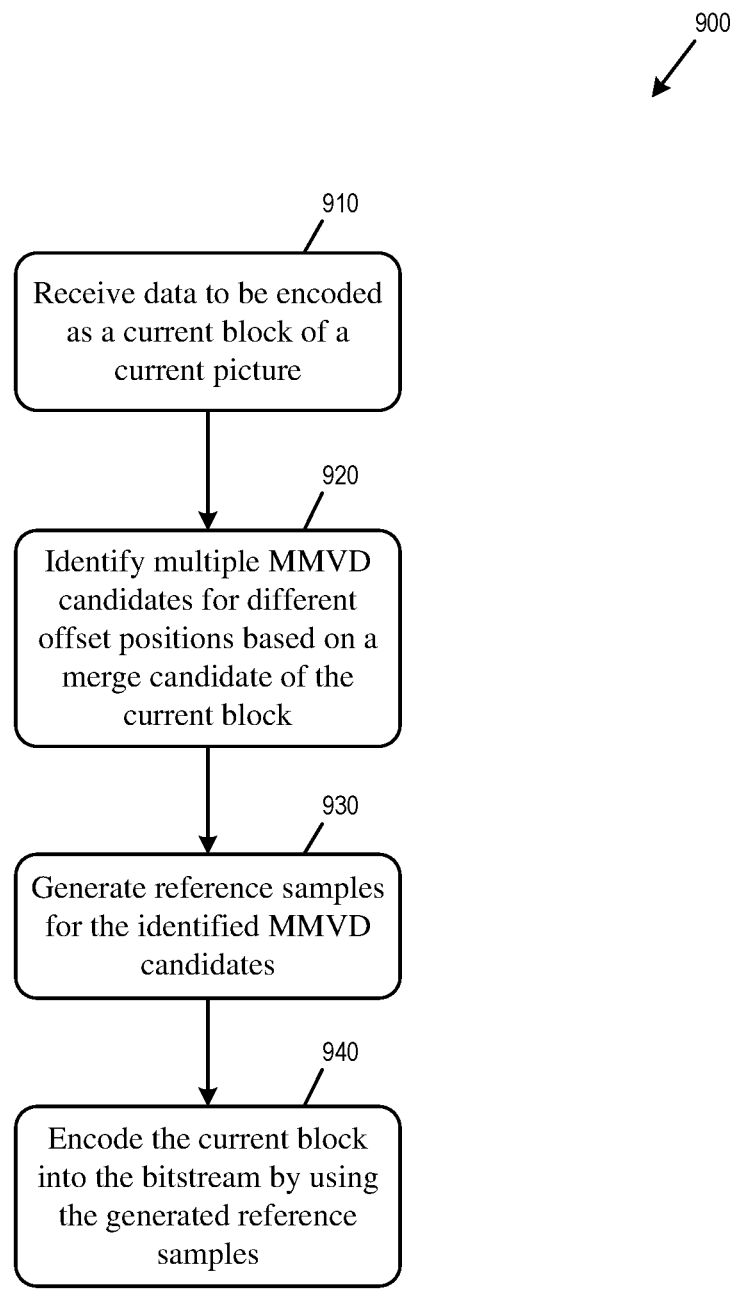
FIG. 9 conceptually illustrates a process for encoding a block of pixels using MMVD.

FIG. 9 conceptually illustrates a process 900 for encoding a block of pixels using MMVD. In some embodiments, one or more processing units (e.g., a processor) of a computing device implements the encoder 700 performs the process 900 by executing instructions stored in a computer readable medium. In some embodiments, an electronic apparatus implementing the encoder 700 performs the process 900.

The encoder receives (at block 910) data to be encoded as a current block of pixels in a current picture. The encoder identifies (at block 920) a plurality of MMVD candidates for different offset positions based on a merge candidate of the current block. The identified MMVD candidates includes MMVD candidates having fractional offset positions (e.g., +½, +¼) and MMVD candidates having integer offset positions (e.g., +1, +2, +4, +8).

The encoder generates (at block 930) reference samples for the identified MMVD candidates. The encoder encodes (at block 940) the current block into the bitstream by using the generated reference samples. In some embodiments, the encoder selects one of the identified MMVD candidates as the prediction mode to encode the current block, such that the generated reference samples for the selected MMVD candidate is the basis of the residual signal being encoded into the bitstream.

In some embodiments, the identified MMVD candidates may include a first group of MMVD candidates and a second group of MMVD candidates, as described by reference to FIGS. 3-4 above. The encoder may generate the reference samples by deriving a first set of reference samples for the first group of MMVD candidates and a second set of reference samples for the second group of MMVD candidates. The encoder may derive the first set of reference samples by accessing reference samples confined to a first access range and derive the second set of reference samples by accessing reference samples confined to a second, different access range. In some embodiments, the first group of MMVD candidates includes two or more vertical MMVD candidates with vertical offset positions from the merge candidate and the second group of MMVD candidates includes two or more horizontal MMVD candidates with horizontal offset positions from the merge candidate. The first group of MMVD candidates may include all vertical MMVD candidates and the second group of MMVD candidates may include all horizontal MMVD candidates for coding the current block using MMVD mode. Processing the MMVD candidates in separate groups allows the encoder to use a reduced access range for MMVD mode.

In some embodiments, the encoder generates the reference samples for the identified MMVD candidates by applying a vertical filter to source reference samples of horizontal MMVD candidates (MMVD candidates having horizontal offset positions) and then applying a horizontal filter to outputs of the vertical filter, as described by reference to FIGS. 6A-B above. The source reference samples may be stored in a shift register for the vertical filter. In some embodiments, each source reference sample has fewer bits (e.g., 10 bits) than a filtered result of each reference sample (e.g., 16 bits). When MMVD candidates come from the unscaled list (not temporally scaled), at least some of the outputs of the horizontal filter are reused for different horizontal filter candidates. Applying the vertical filter before the horizontal filter for the horizontal MMVD candidates may achieve significant saving in computing resources compared to applying the horizontal filter before the vertical filter.

III. Example Video Decoder

In some embodiments, an encoder may signal (or generate) one or more syntax element in a bitstream, such that a decoder may parse said one or more syntax element from the bitstream.

Figure 10:
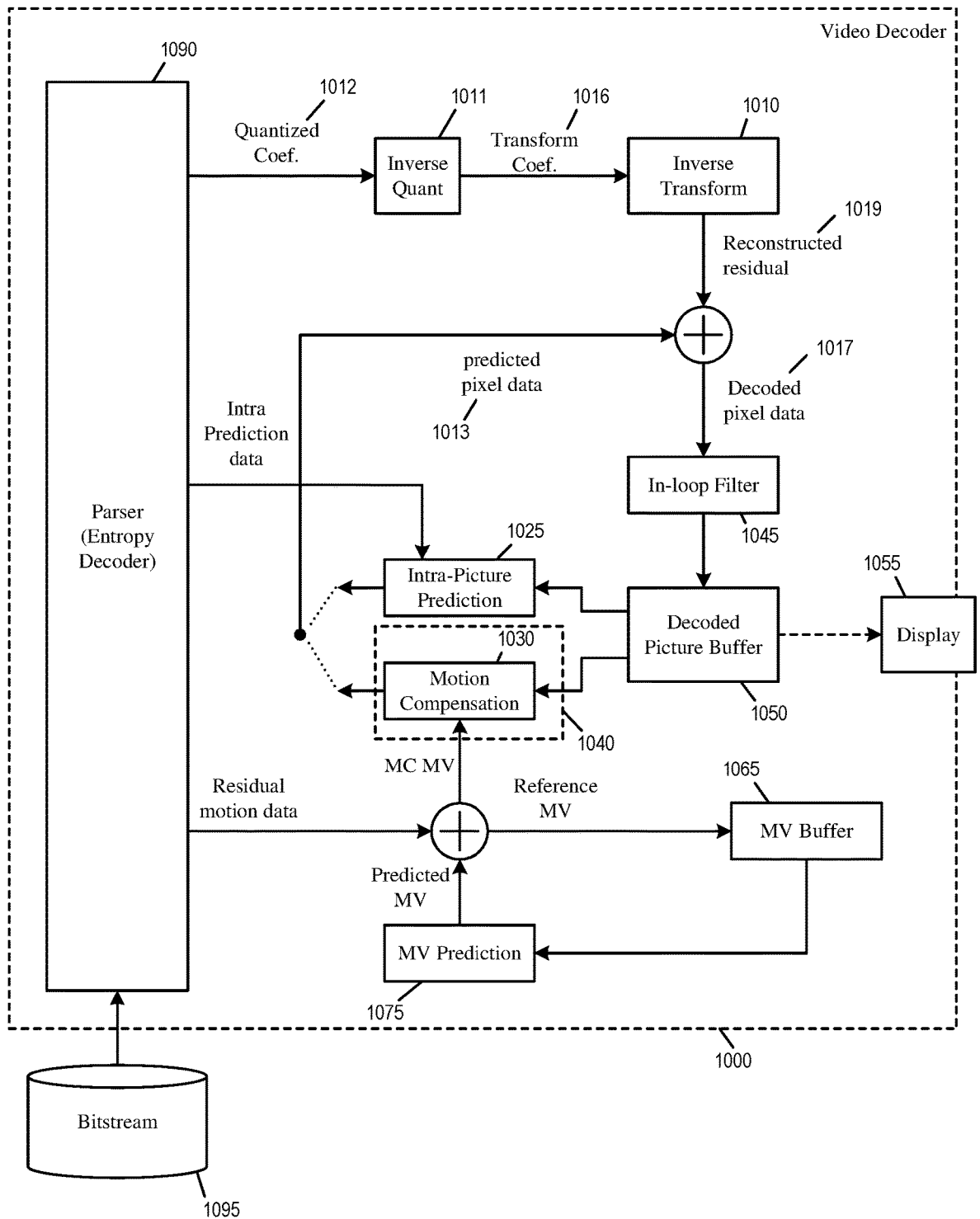
FIG. 10 illustrates an example video decoder that may use MMVD mode.

FIG. 10 illustrates an example video decoder 1000 that may use MMVD mode. As illustrated, the video decoder 1000 is an image-decoding or video-decoding circuit that receives a bitstream 1095 and decodes the content of the bitstream into pixel data of video frames for display. The video decoder 1000 has several components or modules for decoding the bitstream 1095, including some components selected from an inverse quantization module 1011, an inverse transform module 1010, an intra-prediction module 1025, a motion compensation module 1030, an in-loop filter 1045, a decoded picture buffer 1050, a MV buffer 1065, a MV prediction module 1075, and a parser 1090. The motion compensation module 1030 is part of an inter-prediction module 1040.

In some embodiments, the modules 1010-1090 are modules of software instructions being executed by one or more processing units (e.g., a processor) of a computing device. In some embodiments, the modules 1010-1090 are modules of hardware circuits implemented by one or more ICs of an electronic apparatus. Though the modules 1010-1090 are illustrated as being separate modules, some of the modules can be combined into a single module.

The parser 1090 (or entropy decoder) receives the bitstream 1095 and performs initial parsing according to the syntax defined by a video-coding or image-coding standard. The parsed syntax element includes various header elements, flags, as well as quantized data (or quantized coefficients) 1012. The parser 1090 parses out the various syntax elements by using entropy-coding techniques such as context-adaptive binary arithmetic coding (CABAC) or Huffman encoding.

The inverse quantization module 1011 de-quantizes the quantized data (or quantized coefficients) 1012 to obtain transform coefficients, and the inverse transform module 1010 performs inverse transform on the transform coefficients 1016 to produce reconstructed residual signal 1019. The reconstructed residual signal 1019 is added with predicted pixel data 1013 from the intra-prediction module 1025 or the motion compensation module 1030 to produce decoded pixel data 1017. The decoded pixels data are filtered by the in-loop filter 1045 and stored in the decoded picture buffer 1050. In some embodiments, the decoded picture buffer 1050 is a storage external to the video decoder 1000. In some embodiments, the decoded picture buffer 1050 is a storage internal to the video decoder 1000.

The intra-prediction module 1025 receives intra-prediction data from bitstream 1095 and according to which, produces the predicted pixel data 1013 from the decoded pixel data 1017 stored in the decoded picture buffer 1050. In some embodiments, the decoded pixel data 1017 is also stored in a line buffer (not illustrated) for intra-picture prediction and spatial MV prediction.

In some embodiments, the content of the decoded picture buffer 1050 is used for display. A display device 1055 either retrieves the content of the decoded picture buffer 1050 for display directly or retrieves the content of the decoded picture buffer to a display buffer. In some embodiments, the display device receives pixel values from the decoded picture buffer 1050 through a pixel transport.

The motion compensation module 1030 produces predicted pixel data 1013 from the decoded pixel data 1017 stored in the decoded picture buffer 1050 according to motion compensation MVs (MC MVs). These motion compensation MVs are decoded by adding the residual motion data received from the bitstream 1095 with predicted MVs received from the MV prediction module 1075.

The MV prediction module 1075 generates the predicted MVs based on reference MVs that were generated for decoding previous video frames, e.g., the motion compensation MVs that were used to perform motion compensation. The MV prediction module 1075 retrieves the reference MVs of previous video frames from the MV buffer 1065. The video decoder 1000 stores the motion compensation MVs generated for decoding the current video frame in the MV buffer 1065 as reference MVs for producing predicted MVs.

The in-loop filter 1045 performs filtering or smoothing operations on the decoded pixel data 1017 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 11:
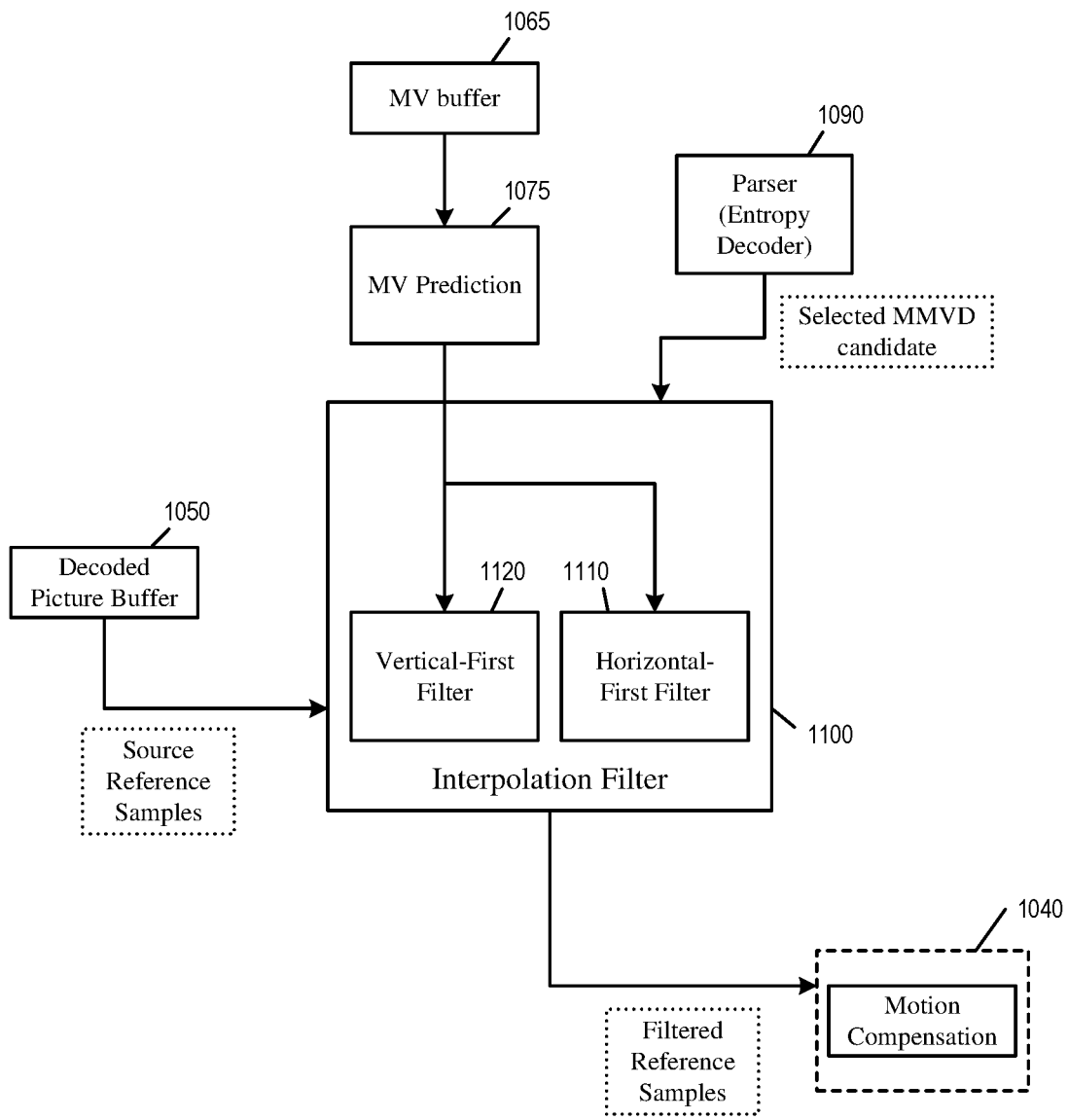
FIG. 11 illustrates portions of the video decoder that implements MMVD mode separation and interpolation reordering.

FIG. 11 illustrates portions of the video decoder 1000 that implements MMVD mode separation and interpolation reordering. Specifically, the figure illustrates the components of the video decoder 1000 that is configured to process the MMVD candidates in two or more groups and to perform vertical filtering before horizontal filtering for some of the MMVD candidates.

As illustrated, the MV prediction module 1075 accesses the MV buffer 1065 to identify candidates for various MV prediction modes, including candidates for merge mode and MMVD mode. An interpolation filter module 1100 receives pixel data from the decoded picture buffer 1050 to be used as source reference samples. The interpolation filter module 1100 performs interpolation for fractional positions based on the source reference samples for various candidates identified by the MV prediction module 1075. For MMVD, one MMVD candidate is generated, which may be a MMVD candidate with horizontal offset or a MMVD candidate with vertical offset.

The interpolation filter module 1100 includes a horizontal-first filter 1110 and a vertical-first filter 1120. The horizontal-first filter 1110 performs horizontal filtering on source reference samples, stores the filtered result in a shift register, and performs vertical filtering on the data stored in the shift register. The vertical-first filter 1120 stores source reference samples in a shift register, performs vertical filtering on the data in the shift register, and performs horizontal filtering on the result of the vertical filtering. The entropy decoder 1090 may provide a selection of a MMVD candidate (based on signaling in the bitstream 1095), for which the interpolation filter 1100 retrieves source reference samples and performs filtering. The output of the interpolation filter module 1100 is then provided to the inter-prediction module 1040 as filtered reference samples for motion compensation operations.

Figure 12:
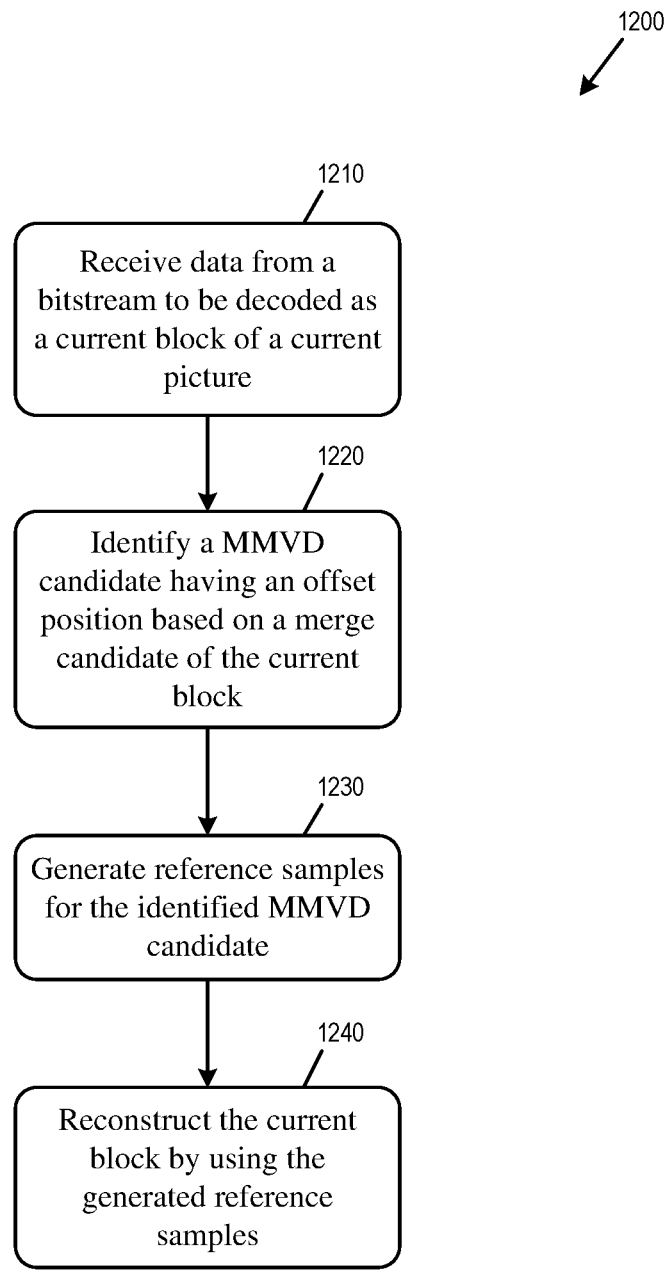
FIG. 12 conceptually illustrates a process for decoding a block of pixels using MMVD.

FIG. 12 conceptually illustrates a process 1200 for decoding a block of pixels using MMVD. In some embodiments, one or more processing units (e.g., a processor) of a computing device implements the decoder 1000 performs the process 1200 by executing instructions stored in a computer readable medium. In some embodiments, an electronic apparatus implementing the decoder 1000 performs the process 1200.

The decoder receives (at block 1210) data to be decoded as a current block of a current picture. The decoder identifies (at block 1220) a MMVD candidate having an offset position based on a merge candidate of the current block. The identified MMVD candidate may be a MMVD candidate having a fractional offset position (e.g., ±½, ±¼) or an integer offset positions (e.g., ±1, ±2, ±4, ±8). In some embodiments, the identified MMVD candidate is the one selected by the encoder and signaled in the bitstream for coding the current block.

The decoder generates (at block 1230) reference samples for the identified MMVD candidate. In some embodiments, the decoder generates the reference samples for the identified MMVD candidate by applying a vertical filter to source reference samples of a horizontal MMVD candidate (MMVD candidates having a horizontal offset position) and then applying a horizontal filter to the output of the vertical filter, as described by reference to FIGS. 6A-B above. The source reference samples may be stored in a shift register for the vertical filter. In some embodiments, each source reference sample has fewer bits (e.g., 10 bits) than a filtered result of each reference sample (e.g., 16 bits). The decoder reconstructs (at block 1240) the current block by using the generated reference samples.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 13:
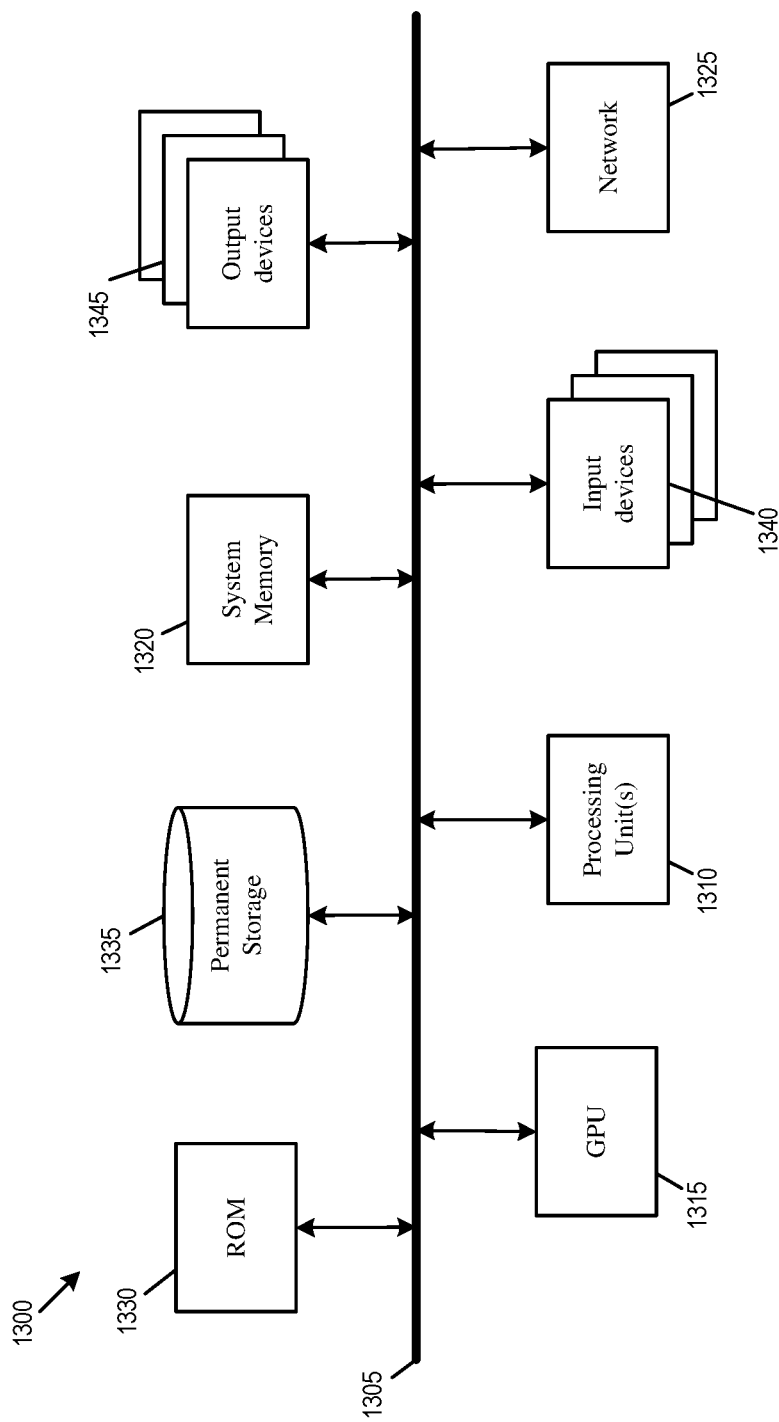
FIG. 13 conceptually illustrates an electronic system with which some embodiments of the present disclosure are implemented.

FIG. 13 conceptually illustrates an electronic system 1300 with which some embodiments of the present disclosure are implemented. The electronic system 1300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1300 includes a bus 1305, processing unit(s) 1310, a graphics-processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the GPU 1315, the read-only memory 1330, the system memory 1320, and the permanent storage device 1335.

From these various memory units, the processing unit(s) 1310 retrieves instructions to execute and data to process in order to execute the processes of the present disclosure. The processing unit(s) may be a single processor or a multi-core processor in different embodiments. Some instructions are passed to and executed by the GPU 1315. The GPU 1315 can offload various computations or complement the image processing provided by the processing unit(s) 1310.

The read-only-memory (ROM) 1330 stores static data and instructions that are used by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the present disclosure use a mass-storage device (such as a magnetic or optical disk and its corresponding disk drive) as the permanent storage device 1335.

Other embodiments use a removable storage device (such as a floppy disk, flash memory device, etc., and its corresponding disk drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor uses at runtime. In some embodiments, processes in accordance with the present disclosure are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 9 and FIG. 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video encoding method comprising:
receiving raw pixel data for a block of pixels to be encoded as a current block of a current picture of a video into a bitstream;
identifying a first Merge Mode with Motion Vector Difference (MMVD) candidate group and a second MMVD candidate group for a merge candidate of the current block, wherein the first MMVD candidate group comprises more than one MMVD candidates having a first offset attribute, and the second MMVD candidate group comprises more than one MMVD candidates having a second offset attribute;
generating reference samples based on the first MMVD candidate group and the second MMVD candidate group; and
encoding the current block into the bitstream by using the generated reference samples.

2. The video encoding method of claim 1, wherein generating the reference samples comprises deriving a first set of reference samples for the more than one MMVD candidates in the first MMVD candidate group and a second set of reference samples for the more than one MMVD candidates in the second MMVD candidate group.

3. The video encoding method of claim 2, wherein deriving the first set of reference samples comprises accessing reference samples confined to a first access range and deriving the second set of reference samples comprises accessing reference samples confined to a second, different access range.

4. The video encoding method of claim 1, wherein the first MMVD candidate group comprises two or more vertical MMVD candidates having vertical offset positions from the merge candidate and the second MMVD candidate group comprises two or more horizontal MMVD candidates having horizontal offset positions from the merge candidate.

5. The video encoding method of claim 4, wherein the first MMVD candidate group comprises all vertical MMVD candidates for coding the current block and the second MMVD candidate group comprises all horizontal MMVD candidates for coding the current block.

6. The video encoding method of claim 1, wherein generating the reference samples comprises applying a vertical filter to source reference samples of horizontal MMVD candidates and applying a horizontal filter to outputs of the vertical filter.

7. The video encoding method of claim 6, wherein the source reference samples are stored in a shift register for the vertical filter.

8. The video encoding method of claim 6, wherein each source reference sample has fewer bits than a filtered result of each reference sample.

9. The video encoding method of claim 6, wherein at least some of the outputs of the horizontal filter are reused for different horizontal filter candidates.

10. The video encoding method of claim 1, wherein at least one of the first MMVD candidate group and the second MMVD candidate group comprises MMVD candidates having fractional offsets and MMVD candidates having integer offsets.

11. The video encoding method of claim 1, wherein the first offset attribute and the second offset attribute are associated with an offset sign or an offset direction.

12. The video encoding method of claim 1, wherein the first offset attribute is associated with vertical direction and the second offset attribute is associated with horizontal direction.

13. A video decoding method comprising:
receiving to-be-decoded data from a bitstream for a block of pixels to be decoded as a current block of a current picture of a video;
identifying a Merge Mode with Motion Vector Difference (MMVD) candidate having an offset positions based on a merge candidate of the current block;
generating reference samples for the identified MMVD candidate by applying a vertical filter to source reference samples of a horizontal MMVD candidate and applying a horizontal filter to outputs of the vertical filter; and
reconstructing the current block by using the generated reference samples.

14. The video decoding method of claim 13, wherein the source reference samples are stored in a shift register for the vertical filter.

15. The video decoding method of claim 13, wherein each source reference sample has fewer bits than a filtered result of each reference sample.

16. The video decoding method of claim 13, wherein the identified MMVD candidate has a fractional offset or an integer offset.

17. An electronic apparatus comprising:
an encoder circuit configured to perform operations comprising:
receiving raw pixel data for a block of pixels to be encoded as a current block of a current picture of a video into a bitstream;
identifying a first Merge Mode with Motion Vector Difference (MMVD) candidate group and a second MMVD candidate group for a merge candidate of the current block, wherein the first MMVD candidate group comprises more than one MMVD candidates having a first offset attribute, and the second MMVD candidate group comprises more than one MMVD candidates having a second offset attribute;
generating reference samples based on the first MMVD candidate group and the second MMVD candidate group; and
encoding the current block into the bitstream by using the generated reference samples.

* * * * *